United States Patent

[11] 3,627,913

[72] Inventor Richard John Godwin Ellis
Cambridge, England
[21] Appl. No. 864,033
[22] Filed Oct. 6, 1969
[45] Patented Dec. 14, 1971
[73] Assignee Pye Limited
[32] Priority Oct. 10, 1968
[33] Great Britain
[31] 48,055/68

[54] TELEVISION VERTICAL BLANKING PULSE GENERATORS
8 Claims, 3 Drawing Figs.

[52] U.S. Cl. .......... 178/5.4 SY, 178/69.5 G, 178/5.4 P
[51] Int. Cl. .......... H04n 9/44, H04n 1/38
[50] Field of Search .......... 178/69.5 CB, 69.5 G, 5.4 P, 69.5 TV, 5.4 SY, 7.1

[56] References Cited
UNITED STATES PATENTS
3,422,223 1/1969 Scipione .......... 178/69.5 G

*Primary Examiner*—Robert L. Griffin
*Assistant Examiner*—John C. Martin
*Attorney*—Frank R. Trifari

ABSTRACT: A vertical blanking pulse generator for a PAL television system features a frequency divider to produce a vertical synchronizing pulse from an input signal of twice the horizontal frequency. An AND gate decodes a pulse from the divider which leads the vertical sync pulse. A pair of frequency dividers produces a color axis gate pulse. Both of the above pulses are applied to pulse generators and then to a second AND gate. A third pulse generator produces the blanking pulse.

*INVENTOR.*
RICHARD J. G. ELLIS
*BY*

AGENT

INVENTOR.
RICHARD J. G. ELLIS
BY

AGENT

*INVENTOR.*
RICHARD J. G. ELLIS
*BY*
AGENT

TELEVISION VERTICAL BLANKING PULSE GENERATORS

The present invention relates to vertical blanking pulse generators and particularly such generators for use with the PAL color television system.

In the PAL system of color television, a color burst signal is transmitted on the "back porch" of each line synchronizing pulse. The phases of the individual bursts alternate ±45° about the mean phase of the subcarrier oscillator on successive lines. The burst phase is controlled by the burst axis gate waveform, which is a square wave of half line frequency with its edges coincident with the line datum points, i.e., the leading edges of the line synchronizing pulses. The color burst has phase $A=+45°$ when the axis gate waveform is positive and has phase $B=-45°$ when the waveform is negative.

In a system employing an odd number of lines per picture, interlaced over two fields, the pattern of phase alternation requires four fields to complete.

In the PAL system the color burst signals are suppressed during the vertical synchronizing signal transmitted at the commencement of each field and during the groups of equalizing pulses which are transmitted before and after each vertical synchronizing signal.

It is therefore necessary to generate a blanking pulse commencing before the first group and ending after the second group of equalizing pulses. That is, for each field the start of the blanking pulse is earlier than the field datum point.

The PAL system also requires that if the last color burst transmitted before a blanking pulse has a particular phase, say *A*, then the first color burst transmitted after that blanking pulse shall have the same phase *A*.

A further requirement is that if the color bursts preceding and following the blanking pulse for one field have phases *A* and *A* then the same shall be true for all fields.

The reason for the above requirements is that if the phases differed, the PAL system would attempt to correct the color signal. The result would be a noticeable flicker at the top of every picture. Prior art systems generated the burst blanking pulse separate from the horizontal and vertical synchronization pulses. This required considerably extra circuitry as that used in the present invention.

To meet these requirements it is found that the blanking pulse must have a width equal to nine line intervals, and that the time by which the leading edge of the blanking pulse precedes the field datum point must vary in a four-field cycle.

Figure 1:
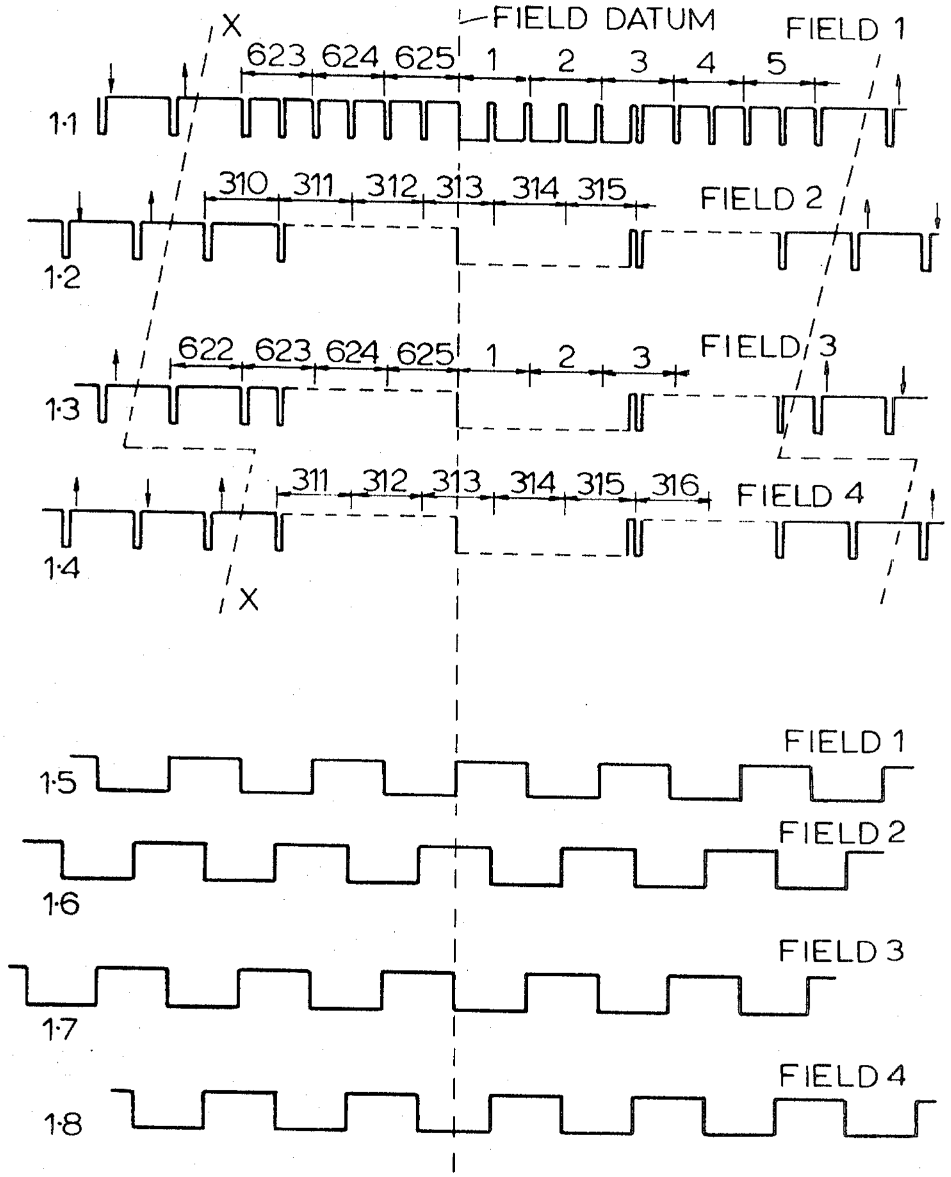

The requirements will become more clear from consideration of the waveforms illustrated in FIG. 1 of the accompanying drawings.

Waveforms 1.1 to 1.4 represent respectively the combined synchronizing signals in the vicinity of the field datum point for four successive fields, and waveforms 1.5 to 1.8 represent the color axis gate signals corresponding respectively to waveforms 1.1. to 1.4.

Each of the waveforms 1.1 to 1.4 shows three line synchronizing pulses, then the group of five equalizing pulses at twice line frequency preceding the field datum point, next the group of five broad pulses comprising the vertical synchronizing signal, is followed by a group of five equalizing pulses, and finally two line synchronizing pulses.

Color burst signals are indicated by vertical arrows, pointing upward for phase A and downward for phase B.

It will be seen that to meet the requirements outlined above, the timing of the leading edge of the blanking pulse must vary from field to field as indicated by the broken line X—X.

It is an object of the present invention to provide an improved form of PAL vertical blanking pulse generator to meet the above requirements.

The present invention provides a vertical blanking pulse generator for a PAL color television system comprising means for producing a first pulse train of field frequency and having a constant time separation equal to four and a half line periods in advance of the vertical synchronizing pulse for said system, means for applying said first pulse train to a first pulse generator for triggering said first pulse generator, said first pulse generator when triggered being adapted to produce an output pulse of a duration lying between two and two and a half line periods, means for applying the output pulses of said first pulse generator as an enabling signal to the first input of a gate circuit, means for producing a second pulse train of half-line frequency the start of the pulses of said second pulse train being coincident with the negative going edges of the pulses of the color axis gate waveform for said system, means for applying said second pulse train to the second input of said gate circuit, means for deriving an output pulse from said gate circuit during the coincidence of the first and second pulse trains at the inputs of said gate circuit, and means for applying the output pulses from said gate circuit to trigger a second pulse generator, said second pulse generator when triggered being adapted to produce a pulse having a duration of nine line periods which constitutes the vertical blanking pulse.

The second pulse train may be produced from a signal at twice line frequency (2H) which is applied to a divide by 2 circuit, whose output at line frequency (H) is employed to trigger a line synchronizing pulse generator. The line frequency signal is also applied to a second divide by 2 circuit whose output is the color axis gate waveform which is employed to trigger a third pulse generator whose output is the second pulse train.

The 2H signal may also be applied to a frequency divider having a ratio of 625 whose output at field frequency V is employed to trigger the vertical synchronizing pulse generator. An advance V signal may be obtained from the 625:1 divider, having the above-constant time separation this signal forming the first pulse train. The width of the output pulse from the first pulse generator may be typically 140 μsec.

Figure 2:
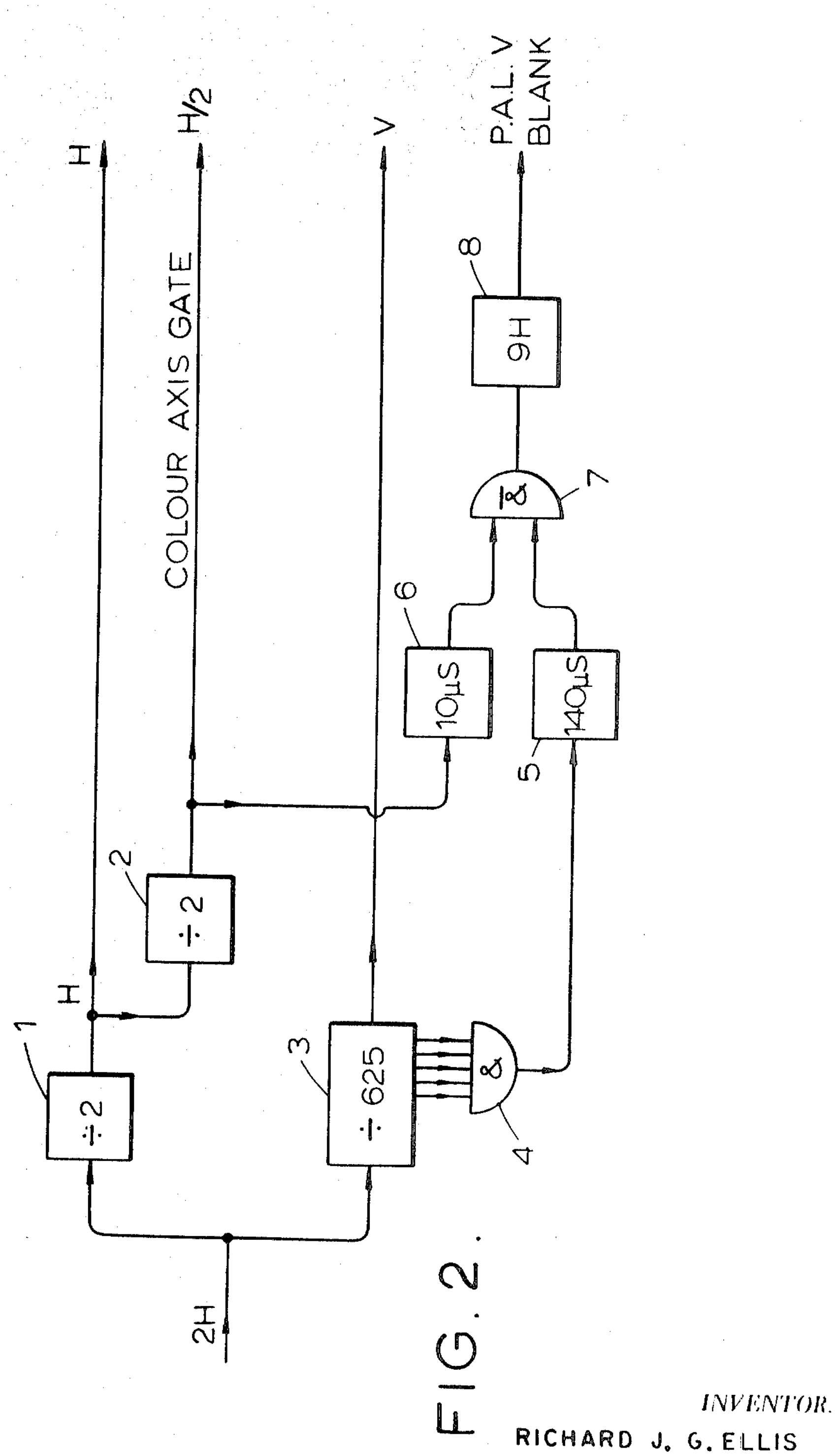
Figure 3:
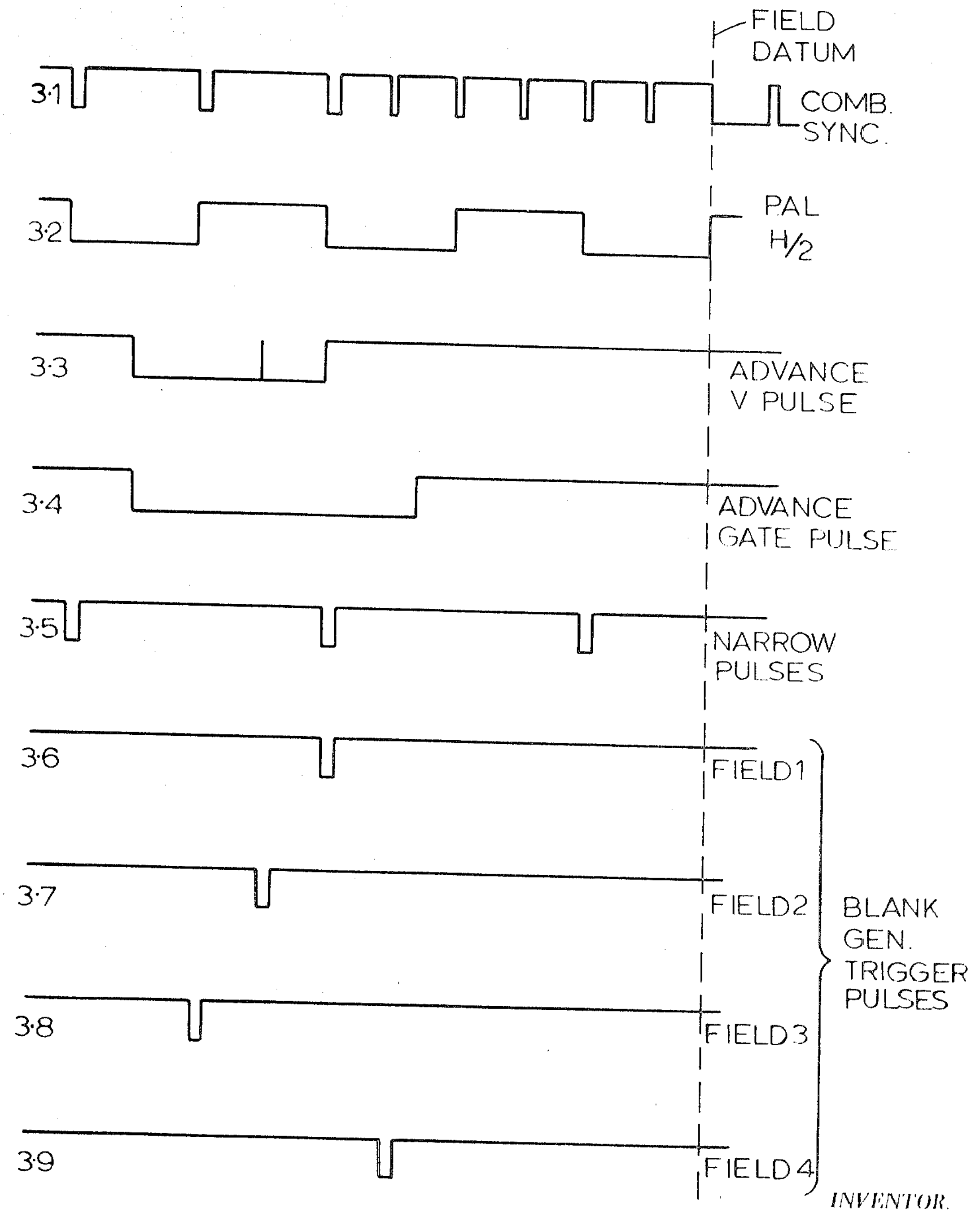

The above and other features of the invention will be described in detail with reference to FIGS. 2 and 3 of the accompanying drawings in which:

FIG. 2 is a block schematic diagram of a vertical blanking pulse generator according to the invention, and FIG. 3 shows waveforms at points in the circuit of FIG. 2.

Referring to FIG. 2, a divide by 2 circuit 1 is driven by a signal 2H of twice line frequency, to produce a signal of line frequency H which is employed to trigger a horizontal synchronizing pulse generator (not shown). A further divide by 2 circuit 2 is connected to the output of circuit 1 and produces the color axis gate waveform (FIG. 1, waveforms 1.5 to 1.8). A divide by 625 circuit 3 is also driven by the incoming 2H signal and produces a signal of field frequency V which is employed to trigger a vertical synchronizing pulse generator (not shown). The circuits 1, 2 and 3 are employed in a known synchronizing generator systems.

The divider 3 comprises an arrangement of binary counters, with suitable feedback loops, arranged to give an output pulse from its final stage for every 625 input pulses of frequency 2H.

A multi-input AND-gate 4 has its inputs connected to the outputs of selected individual stages in divider 3, in such a manner as to decode the state of the counters and provide an output commencing with the 616th input pulse counted. The exact length of the output pulse from gate 4 is not material since only the loading edge is employed to trigger a pulse generator 5. Pulse generator 5 produces a pulse typically 140 μsec. in width each time it is triggered by the leading edge of the output pulse from gate 4.

The relative timings of the various waveforms are illustrated in FIG. 3. Waveform 3.1 is an expanded portion of the combined synchronizing signal corresponding to waveform 1.1 of FIG. 1, and waveform 3.2 is the color axis gate waveform for waveform 3.1. Waveform 3.3 is the advanced V pulse, i.e., the output of gate 4. This waveform may show spikes, caused by changes of state of stages in counter 3 which occur during the advanced V pulse. Provided, however, that the advance V pulse terminates before the end of the pulse produced by pulse generator 5, such spikes are unable to affect the generator 5. The advanced gate pulse produced by generator 5 is shown in waveform 3.4. It will be seen that the leading edge of this pulse occurs 4½ lines ahead of the field datum point, and this will be true for all fields.

Returning to FIG. 2, a further pulse generator 6 is triggered by the negative going edges of the color axis gate waveform, and produces narrow (typically 10 $\mu$sec.) negative going pulses. The pulses corresponding to waveform 3.2 are shown as waveform 3.5.

The outputs of pulse generators 5 and 6 are gated together in NAND-gate 7. For the condition of waveforms 3.1 and 3.2, equivalent to waveforms 1.1 and 1.5 of FIG. 1, the output of gate 7 is a negative going pulse with its leading edge 3 line periods earlier than the field datum, and is shown as waveform 3.6.

On the second field, the axis gate waveform has advanced in phase half a line period (waveform 1.6), and the output of gate 7 will be a pulse 3½-line periods before field datum (3.7).

On the third field, the output of gate 7 will be four line periods before field datum (FIG. 3.8), and for the fourth field 2½-line periods (FIG. 3.9).

The negative-going leading edge of the output pulse from gate 7 is employed to trigger a pulse generator 8, which produces a pulse of duration equal to nine line periods, this pulse being employed as the PAL vertical blanking signal.

The timing of the vertical blanking pulse therefore varies in a four-field cycle in such a way that the last color burst before a blanking pulse and the first color burst after it always have the required phase *A* (+45°).

I claim:

1. A vertical blanking pulse generator for a PAL color television system comprising input means for receiving a signal having a frequency of twice the line frequency of said system; first means for generating color axis gate pulses having one-half of said line frequency coupled to said input means; second means coupled to said first generating means for generating a train of pulses having leading edges coincident with the trailing edges of said color axis gate pulses; third means for generating vertical synchronizing pulses coupled to said input means; fourth means coupled to said third generating means for generating a train of pulses starting about 4½-line periods ahead of said vertical synchronizing pulses and having a duration of between 2 and 2½-line periods; a first AND gate having inputs coupled to said second and fourth generating mean respectively; and means for producing said vertical blanking pulse having a duration of nine line periods coupled to said AND gate.

2. A generator as claimed in claim 1 wherein said third generating means comprises a first frequency divider.

3. A generator as claimed in claim 1 wherein said fourth generating means comprises a second AND gate coupled to said third generating means.

4. A generator as claimed in claim 1 wherein said fourth generating means comprises a first pulse generator coupled to said AND gate.

5. A generator as claimed in claim 1 wherein said first generating means comprises a second frequency divider means coupled to said input means for producing a horizontal synchronizing pulse, and a third frequency divider coupled between said second frequency divider and said second generating means.

6. A generator as claimed in claim 1 wherein said second generating means comprises a pulse generator.

7. A generator as claimed in claim 1 wherein said producing means comprises a pulse generator.

8. A generator as claimed in claim 1 wherein said AND gate comprises an inverting AND gate.

* * * * *